(12) United States Patent
Mariner et al.

(10) Patent No.: US 8,739,918 B2
(45) Date of Patent: Jun. 3, 2014

(54) EXHAUST SYSTEMS FOR VEHICLES

(75) Inventors: Gerhard Mariner, Bidingen (DE);
Andreas Kleinhenz, Rosshaupten (DE);
Guido Nagele, Marktoberdorf (DE);
Hans Heinle, Biessenhofen (DE);
Robert Heisler, Marktoberdorf (DE)

(73) Assignee: AGCO GmbH (DE)

( * ) Notice: Subject to any disclaimer, the term of this patent is extended or adjusted under 35 U.S.C. 154(b) by 304 days.

(21) Appl. No.: 13/139,398

(22) PCT Filed: Dec. 7, 2009

(86) PCT No.: PCT/EP2009/066555
§ 371 (c)(1),
(2), (4) Date: Aug. 12, 2011

(87) PCT Pub. No.: WO2010/069807
PCT Pub. Date: Jun. 24, 2010

(65) Prior Publication Data
US 2011/0284308 A1  Nov. 24, 2011

(30) Foreign Application Priority Data
Dec. 19, 2008 (GB) .................................. 0823113.6

(51) Int. Cl.
*B60K 13/04* (2006.01)
(52) U.S. Cl.
USPC ............................................ 180/309; 60/302
(58) Field of Classification Search
USPC ............................................ 180/309; 60/302
See application file for complete search history.

(56) References Cited

U.S. PATENT DOCUMENTS

| | | | | |
|---|---|---|---|---|
| 3,441,381 A | * | 4/1969 | Schreuders et al. | 422/176 |
| 4,087,966 A | * | 5/1978 | Akado et al. | 60/278 |
| 4,300,516 A | * | 11/1981 | Hayakawa | 123/568.27 |
| 4,433,666 A | * | 2/1984 | Masaki et al. | 123/568.22 |
| 4,495,153 A | * | 1/1985 | Midorikawa | 422/171 |
| 4,709,549 A | | 12/1987 | Lepperhoff | |

(Continued)

FOREIGN PATENT DOCUMENTS

DE 202007010435 U1 10/2007
EP 2011559 A 1/2009

(Continued)

OTHER PUBLICATIONS

International Search Report for International Application No. PCT/EP2009/06555 dated Feb. 24, 2010.

(Continued)

*Primary Examiner* — Jeffrey J Restifo

(57) ABSTRACT

An exhaust system for an agricultural and/or industrial tractor (10) having an internal combustion engine (11) located in an engine compartment covered by an engine hood (11a). The system includes an exhaust gas treatment unit (16) located inside the engine compartment hood and having a main chamber (18) fed by an inlet pipe (15) which receives exhaust gases from the engine and an outlet pipe (17) which passes treated gases into a final portion (14a, 14b) of the exhaust system. The inlet and outlet pipes (15,17) are non-aligned and extending alongside the main chamber (18) in opposite directions to reduce the overall length of the treatment unit. The treatment unit (16) may be installed above the engine (11) with the exhaust gases passing through the unit either generally normal or parallel to the direction of driving (D) of the tractor.

6 Claims, 4 Drawing Sheets

(56) References Cited

U.S. PATENT DOCUMENTS

| | | | |
|---|---|---|---|
| 5,388,407 A * | 2/1995 | Capers et al. | 60/302 |
| 5,398,504 A * | 3/1995 | Hirota et al. | 60/302 |
| 5,438,830 A * | 8/1995 | Matsumura | 60/302 |
| 5,653,105 A * | 8/1997 | Noirot et al. | 60/297 |
| 6,555,070 B1 | 4/2003 | Kruger | |
| 6,941,749 B1 * | 9/2005 | Noirot | 60/297 |
| 7,788,913 B2 * | 9/2010 | Midgley et al. | 60/302 |
| 7,886,610 B2 * | 2/2011 | Gustafson et al. | 73/736 |
| 7,981,174 B2 * | 7/2011 | Bailey et al. | 55/282.3 |
| 8,359,848 B2 * | 1/2013 | Bruza et al. | 60/324 |
| 2007/0186546 A1 | 8/2007 | Midgley et al. | 60/302 |
| 2009/0127265 A1 * | 5/2009 | Magnusson et al. | 220/564 |
| 2011/0184631 A1 * | 7/2011 | Winsor et al. | 701/108 |
| 2011/0232362 A1 * | 9/2011 | Thiagarajan et al. | 73/23.33 |
| 2011/0283687 A1 * | 11/2011 | Dobler et al. | 60/299 |
| 2011/0284308 A1 * | 11/2011 | Mariner et al. | 180/309 |
| 2012/0036833 A1 * | 2/2012 | Schertz et al. | 60/274 |
| 2012/0036843 A1 * | 2/2012 | Schertz et al. | 60/301 |
| 2012/0042637 A1 * | 2/2012 | Roozenboom et al. | 60/297 |
| 2012/0067661 A1 * | 3/2012 | Kashu et al. | 180/309 |
| 2012/0138379 A1 * | 6/2012 | Tsuji et al. | 180/309 |
| 2012/0217082 A1 * | 8/2012 | Kleinhenz et al. | 180/309 |
| 2013/0025557 A1 * | 1/2013 | Chlystek et al. | 123/184.21 |

FOREIGN PATENT DOCUMENTS

| | | |
|---|---|---|
| FR | 2599082 A1 | 11/1987 |
| GB | 1052103 A | 12/1966 |
| JP | 55067311 U | 5/1980 |
| JP | 01063720 U | 4/1989 |
| WO | WO-0039437 A1 | 7/2000 |
| WO | WO-03072915 A1 | 9/2003 |

OTHER PUBLICATIONS

GB Search Report for GB Application No. 0823113.6 dated May 7, 2009.

* cited by examiner

EXHAUST SYSTEMS FOR VEHICLES

This invention relates to exhaust systems for vehicles, and in particular to such systems for agricultural and/or industrial tractors, which includes an exhaust gas treatment unit to reduce the level of gas contaminants to the legally required levels.

It is an object of the present invention to provide such an exhaust system which allows the treatment unit to be conveniently fitted within an engine compartment of the vehicle in an efficient and low cost manner which has minimum impact on the design of the remainder of the vehicle.

Thus according to the present invention there is provided an exhaust system for an agricultural or industrial engine located in an engine compartment covered by an engine hood, the system including an exhaust gas treatment unit located inside the engine compartment hood and having a main chamber fed by an inlet pipe which receives exhaust gases from the engine and an outlet pipe which passes treated gases into a final portion of the exhaust system, the inlet and outlet pipes being non-aligned and extending alongside the main chambers in opposite directions to reduce the overall length of the treatment unit.

As will be appreciated such a treatment unit is particularly compact and is suitable for positioning inside the engine hood where space is at a premium.

Such treatment unit allows tractors not previously provided with exhaust gas treatment to be readily adapted to provide such treatment.

In addition, the compact design of the treatment unit allows installation of the unit so that exhaust gas passes through the main chamber in a direction normal to the driving direction of the tractor.

The non-aligned inlet and outlet pipes which gives the compact design also allows the installation above the eingine.

The inlet pipe of the treatment unit may be provided with a urea injector and/or an exhaust gas temperature sensor to simplify installation of the unit.

The end of the main chamber of the treatment unit may be double-walled to provide heat insulation for other components under the hood.

Similarly one or both of the inlet and outlet pipes may be double-walled to provide heat insulation for other components under the hood.

The main chamber of the unit preferably includes one or more of the following components namely an oxidation catalyser, an NOx catalyser and/or a NOx, HC, $NH_3$ absorber arranged in series.

The invention also provides an exhaust gas treatment unit for use on the above exhaust system, the unit having a main chamber fed by an inlet pipe which receives exhaust gases from the engine and an outlet pipe which passes treated gases into a final portion of the exhaust system, the inlet and outlet pipes being non-aligned and extending alongside the main chambers in opposite directions to reduce the overall length of the treatment unit.

The present invention will now be described, by way of example, with reference to the accompanying drawings in which.

Figure 1:
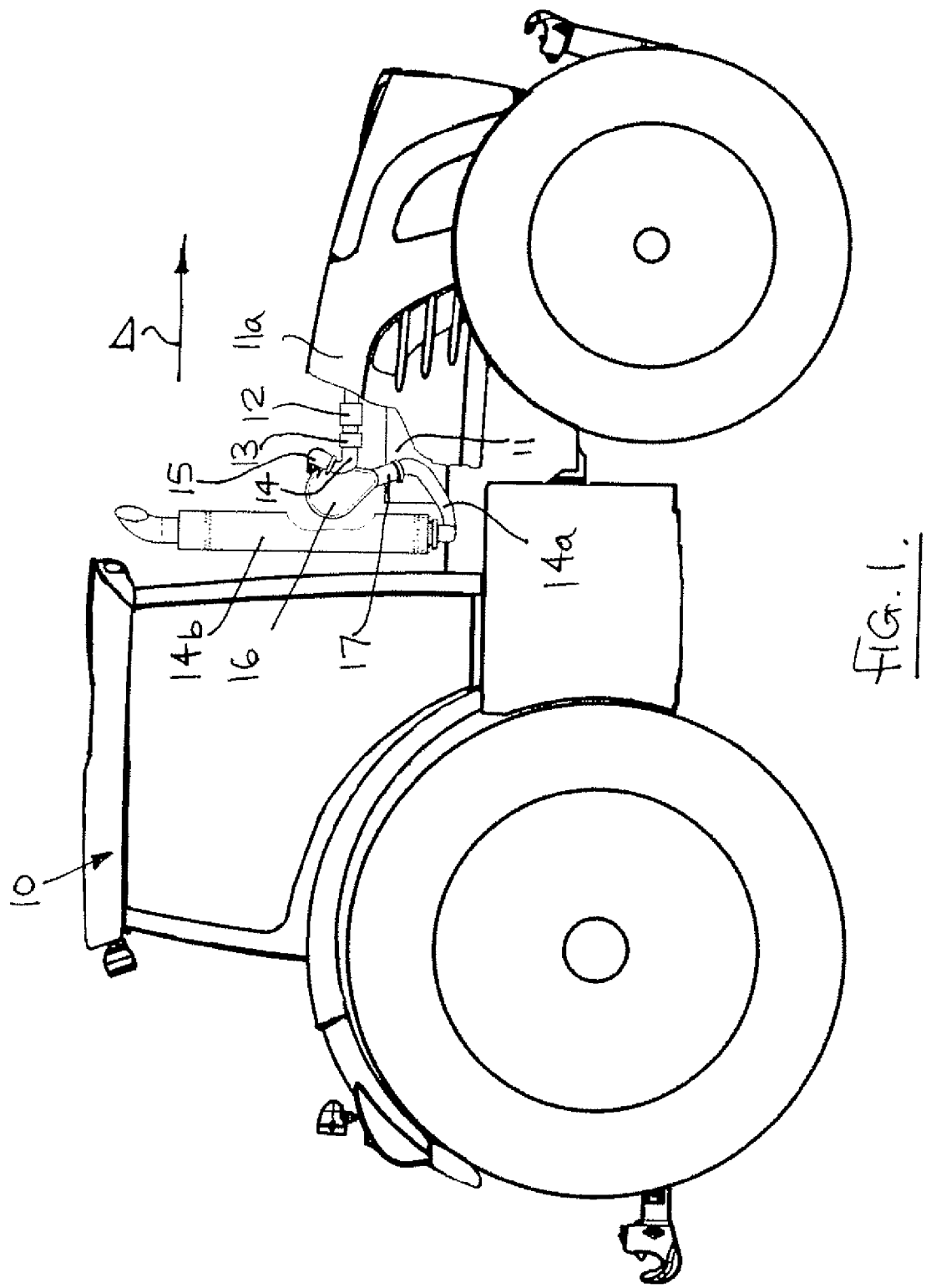
FIG. 1 shows an agricultural tractor fitted with an exhaust system in accordance with the present invention with part of the engine compartment hood removed for clarity.
Figure 3:
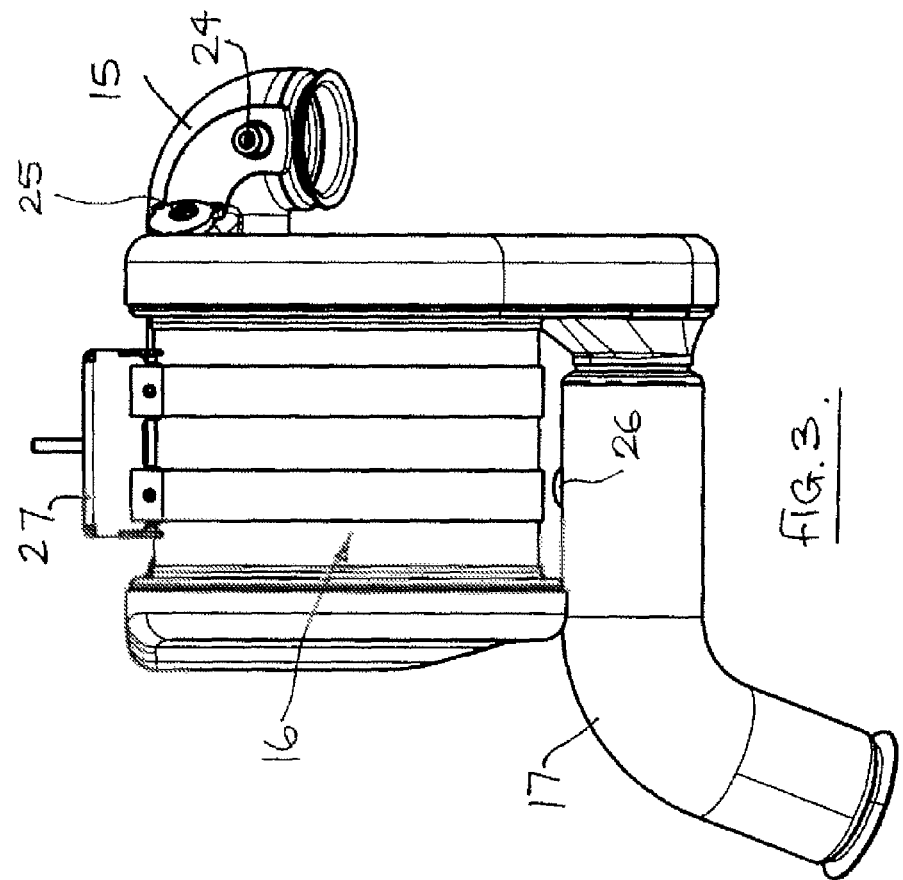
FIG. 3 shows a side view of the treatment unit of FIG. 2.
Figure 2:
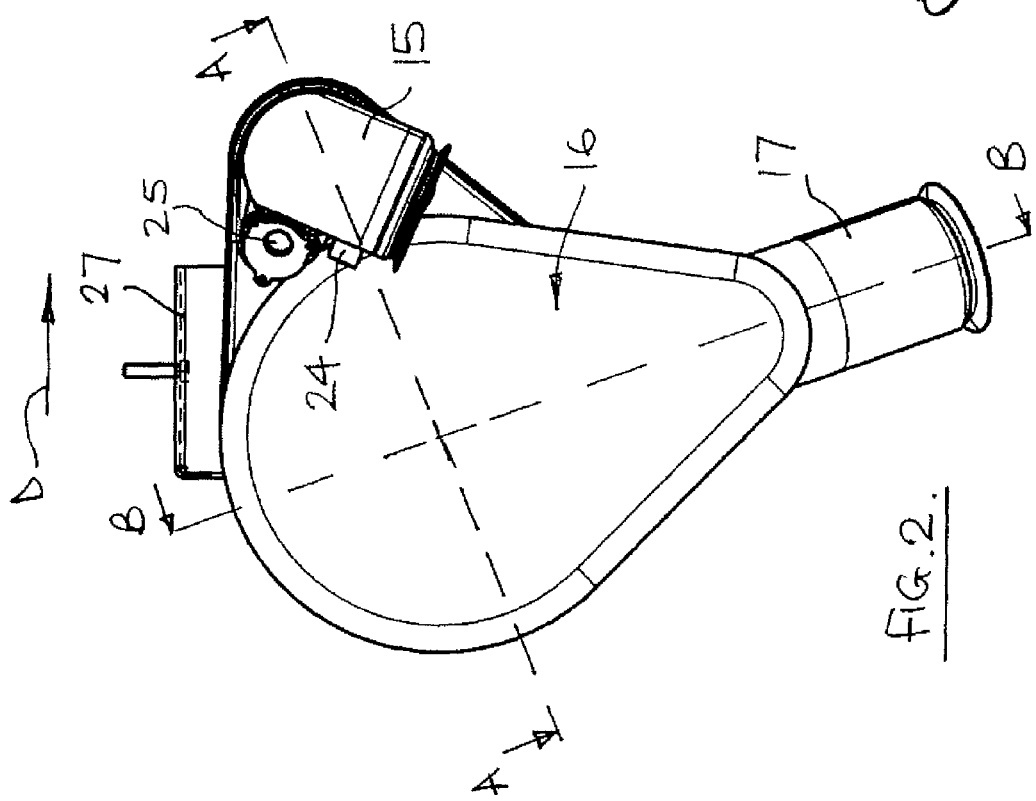
FIG. 2 shows an end view of a gas treatment unit used in the exhaust system of FIG. 1.
Figure 5:
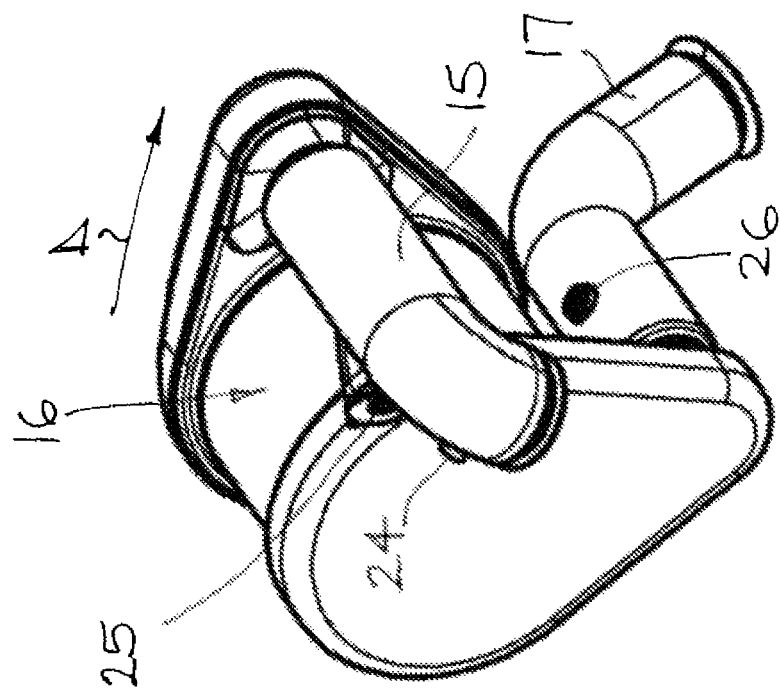
FIG. 5 shows a perspective view of the treatment unit of FIG. 2.
Figure 4:
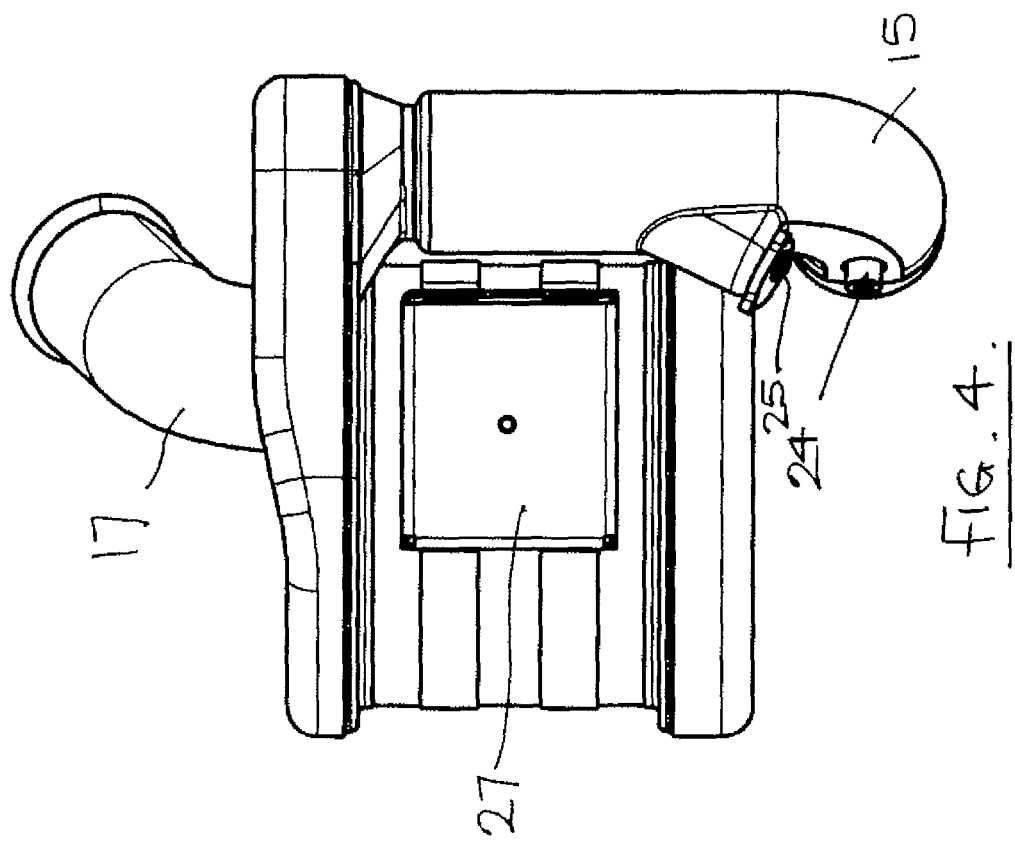
FIG. 4 shows a plan view of the unit of FIG. 2.

Referring to the drawings, an agricultural tractor 10 has an engine 11 mounted in an engine compartment defined by an engine hood 11*a* part of which is cut away in FIG. 1 for clarity. The engine has an exhaust which includes a turbo charger 12 and an engine braking throttle valve 13. Exhaust section 14 is connected to the inlet pipe 15 of an exhaust gas treatment unit 16 which also has an outlet pipe 17 which is connected by exhaust section 14*a* to a generally vertically extending silencer 14*b*. The treatment unit 16 has a main chamber 18 in which an oxidation catalyser 19, a NOx catalyser 20, and a NOx, HC, $NH_3$ absorber 21 are located in series. The presence of the oxidation catalyser 19, the NOx catalyser 20 and the NOx, HC, $NH_3$ absorber 21 depends on the vehicle requirements and can vary. The main chamber 18 is oriented so that exhaust gases pass through the chamber in a direction horizontal and normal to the driving direction D of the vehicle.

Inlet pipe 15 and outlet pipe 17 are non-aligned and extend generally parallel to each other along the outside of the main chamber 18 of the treatment unit 16. This provides a particularly compact arrangement in which the overall length of the gas treatment unit is significantly reduced.

Inlet pipe 15 is connected with an inlet end guidance chamber 22 which directs the incoming exhaust gases in to the oxidation catalyser 19 and hence through the NOx catalyser 20 and into the NOx, HC, $NH_3$ absorber 21. Gas leaves the treatment unit via an outlet guidance chamber 23 and hence to the outlet pipe 17.

As can be seen from FIGS. 6 and 7, the inlet guidance chamber 22 is defined by two main components 22*a* and 22*b* which are welded together and a third outer component 22*c* which is spaced from the component 22*a* to provide an air gap 22*d* which provides a level of some heat insulation for other components mounted under the engine compartment hood 11*a* from the heat which will be given off by the gas treatment unit. Similarly an outlet guidance chamber 23 is formed from components 23*a* and 23*b* which are welded together and is also provided with an outer component 23*c* which is again spaced from the component 23*a* to provide an air gap 23*d* to provide further heat insulation.

Figure 7:
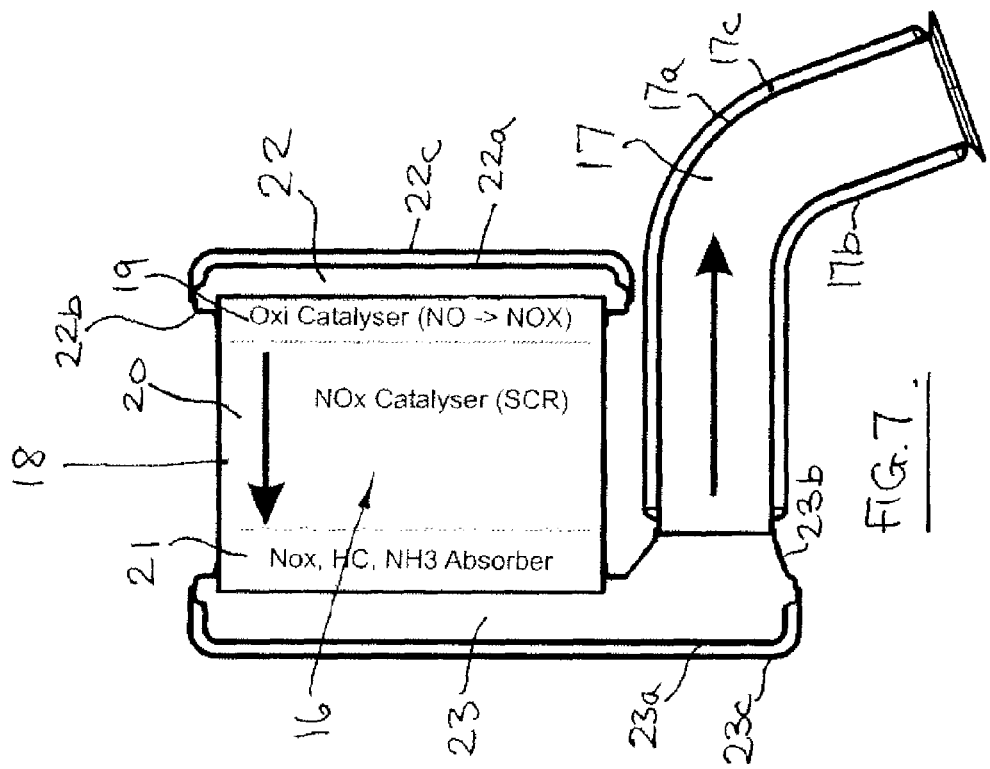
FIG. 7 shows a section on the line B-B of FIG. 2.
Figure 6:
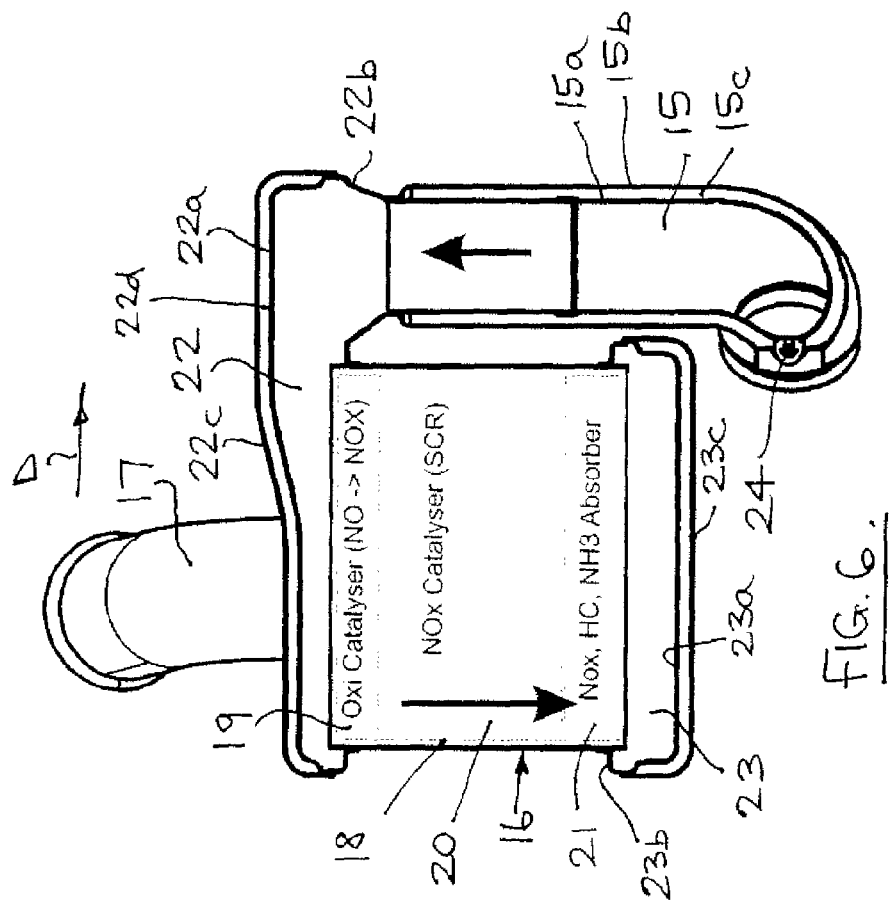
FIG. 6 shows a section on the line A-A of FIG. 2.

As can be seen from FIGS. 6 and 7 the inlet pipe 15 and outlet pipe 17 can also be of doubled walled construction having inner and outer walls 15*a*,15*b* and 17*a*,17*b* respectively which are spaced to provide an air gap 15*c* and 17*c* respectively for the provision of further heat insulation for other components under the hood.

The gas treatment unit carries an exhaust gas sensor 24 and a urea injecting unit 25 on the inlet pipe 15. A NOx sensor 26 is also provided on the outlet pipe 17.

A support bracket 27 is secured to the outer surface of the main chamber of the treatment unit and is used to secure the treatment unit in its operating position within the engine compartment hood.

In the above described embodiment the exhaust gases pass through the main chamber 18 generally horizontally and normal to the driving direction D. It is envisaged that he treatment unit 16 may also be installed so that the exhaust gases pass through the main chamber in a direction parallel to the direction of driving D.

It is also envisaged that the treatment unit 16 may include not all the elements mentioned above or may include other elements to reduce the level of gas contaminants to the legally required levels (e.g. a diesel particulate filter may be included). The treatment unit may also include any combination of known means to reduce the level of gas contaminants to the legally required levels.

As will be appreciated, the above described exhaust gas treatment unit is of an extremely compact construction and is therefore readily mountable inside the engine compartment under the engine hood. This compact construction allows tractors not previously provided with exhaust gas treatment units to be readily adapted for the provision of such units before or after sale.

The invention claimed is:

1. An exhaust system for an agricultural or industrial tractor having an internal combustion engine located in an engine compartment covered by an engine hood, the system including an exhaust gas treatment unit located inside the engine compartment hood and having a main chamber fed by an inlet pipe which receives exhaust gases from the engine and an outlet pipe which passes treated gases into a final portion of the exhaust, the exhaust treatment unit being installed above the engine and orientated generally transverse relative to the tractor so that the exhaust gases pass through the main chamber of the unit in a direction generally normal to the driving direction of the tractor and the inlet and outlet pipes are non-aligned and extend alongside the main chamber in opposite directions to reduce the overall length of the treatment unit.

2. An exhaust system according to claim 1 in which the gas treatment unit is provided with one or more of a urea injector, an exhaust gas temperature sensor and a NOx sensor to simplify installation of the unit.

3. An exhaust system according to claim 1 in which the end of the main chamber of the treatment unit is of a double walled construction to provide heat installation for other components under the hood.

4. An exhaust system according to claim 1 in which one or both of the inlet and exhaust pipes is of a double walled construction to provide heat installation for other components under the hood.

5. An exhaust system according to claim 1 in which the main chamber of the exhaust gas treatment unit includes one or more of the following components, namely an oxidation catalyser, an NOx catalyser and an NOx, HC, NH3 absorber arranged in series.

6. An exhaust gas treatment unit for use in the exhaust system of claim 1 in which the treatment unit has a main chamber fed by an inlet pipe which receives exhaust gases from the engine and an outlet pipe which passes treated gases into a final portion of the exhaust system, the inlet and outlet pipes being non-aligned and extending alongside the main chamber in opposite directions to reduce the overall length of the treatment unit.

* * * * *